June 12, 1928.
B. O. McMANUS
1,673,296
ELECTRIC HEATER, TOASTER, AND COOKER
Filed Dec. 27, 1926
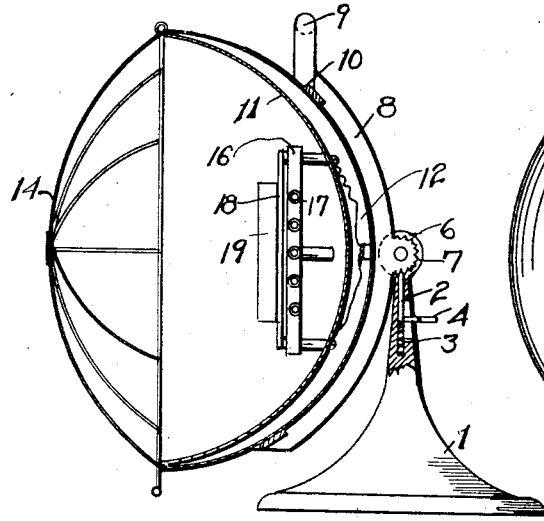
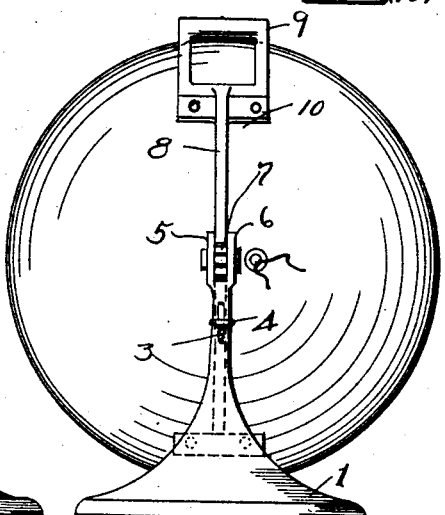
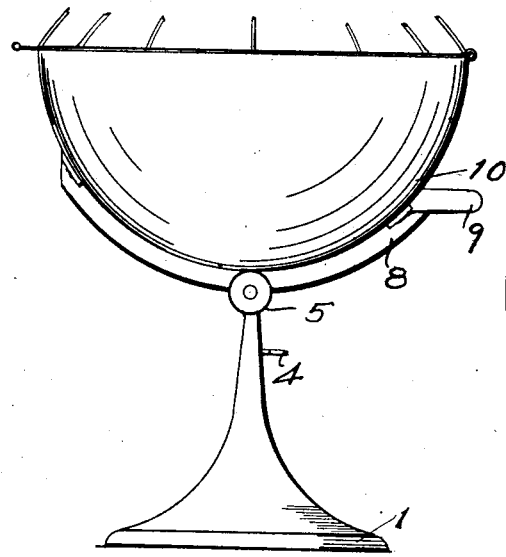
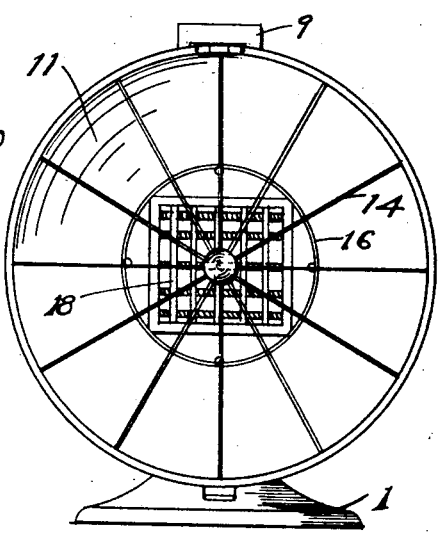
INVENTOR.
Bernard O. McManus,
BY
Carlos P. Griffin
ATTORNEY.

Patented June 12, 1928.

1,673,296

UNITED STATES PATENT OFFICE.

BERNARD O. McMANUS, OF SAN FRANCISCO, CALIFORNIA.

ELECTRIC HEATER, TOASTER, AND COOKER.

Application filed December 27, 1926. Serial No. 157,185.

This invention relates to a convertible electric heater, and its object is to provide an electric heater which is capable of being used both for the purpose of a room heater or air heater so-called, and for the purpose of being used as a stove or convenient heater for light cooking and the making of toast.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a vertical sectional view through the heater showing the heater as it is commonly used for heating a room, Figure 2 is a back elevation of the heater, Figures 3 is a side elevation of the heater as it appears when in use for cooking of any kind, and Figure 4 is a front elevation of the heater, looking in the reverse direction from Figure 2.

The heater has a heavy base 1, ordinarily weighted with iron and made of spun metal, or it may be made of wood, as may be desired. At the top of the base 1 there is a snap slide 2 which is normally held in the raised position by means of a small spiral spring 3, said snap slide is operated by means of a small handle 4 which projects through a slot in the top of the base 1.

At the top of the base there are two ears 5 and 6 which frictionally engage a boss 7, said boss having a plurality of notches in it to hold the heater proper in any desired position. Attached to the boss 7 is a semi-circular frame 8 which has a handle 9 at its upper end the frame 8 is secured to a semi-spherical or semi-elliptical shell 10, while a reflector 11 is secured inside the member 10 and is spaced therefrom a short distance as indicated at 12 in Figure 1. At the outer edges the two members 10 and 11 come together and they are beaded over one another so as to make a unit.

When the heater is used merely as an air heater or room heater, it has a wire cover 14, which is detachably connected to the reflector members, and the object of which is to prevent clothing from coming in contact with the heating elements within the reflector. Within the reflector 11, and substantially at the bottom of the same, there is a rectangular porcelain or other insulated heat resistant stand 16, which stand is provided with a plurality of heating coils of microme or other heat resistant wire as indicated at 17. Over this stand there are other wires stiff enough to stand the heat and to support a considerable load, as a tea kettle, or other pot to be placed thereon, or pieces of bread may be placed thereon as indicated at 19 to be toasted. The supporting wires form a grid as indicated at 18. The slide latch 2 enables the reflectors to be placed either in the position shown in Figure 1, or turned to the horizontal position shown in Fig. 3, and the shape of the reflector is such that practically none of the heat generated by the current in the coils 17 will be wasted.

Having thus described my invention, what I desire to secure by Letters Patent of the United States is as follows, but modifications may be made in carrying out the invention as shown in the drawings and in the above particularly described form thereof, within the purview of the annexed claim:

An electric heater toaster and cooker of the class described comprising a reflecting shell, a semi-circular frame on said shell, a boss having a plurality of notches therein on said frame, a base having ears adapted to receive said boss, a pivot bolt for said boss and said ears, a spring retained slide in said base adapted to engage the notches of said boss, a handle on said slide, an electric heating element in said shell, a hinged wire guard for said shell and a handle on said semi-circular frame.

In testimony whereof I have hereunto set my hand this 18th day of December, A. D. 1926.

BERNARD O. McMANUS.